United States Patent [19]

Ando

[11] Patent Number: 5,105,877
[45] Date of Patent: Apr. 21, 1992

[54] HEAT EXCHANGER AND METHOD FOR MANUFACTURING

[75] Inventor: Nobuyasu Ando, Takasaki, Japan

[73] Assignee: Sanden Corporation, Japan

[21] Appl. No.: 593,061

[22] Filed: Oct. 5, 1990

[30] Foreign Application Priority Data

Oct. 6, 1989 [JP] Japan ............... 1-117799[U]

[51] Int. Cl.⁵ .................. F28D 1/047; B21D 39/06
[52] U.S. Cl. .............................. 165/150; 165/178;
    29/890.043; 228/173.4; 285/382.4
[58] Field of Search ............... 165/150, 79, 178, 152,
    165/173; 228/173.2, 173.4, 136; 29/890.039,
    890.041, 890.043, 890.049; 285/382.4

[56] References Cited

U.S. PATENT DOCUMENTS

| | | | |
|---|---|---|---|
| 2,573,161 | 10/1951 | Tadewald | 165/178 |
| 2,816,739 | 12/1957 | Stoehr | 165/76 |
| 2,956,334 | 10/1960 | Stewart | 285/382.4 |
| 3,047,937 | 8/1962 | Vecchi | 285/382.4 |
| 3,972,371 | 8/1976 | Plegat | 165/178 |
| 4,887,853 | 12/1989 | Flowers et al. | 285/382.4 |
| 4,945,983 | 8/1990 | Dalo | 165/150 |

FOREIGN PATENT DOCUMENTS

| | | | |
|---|---|---|---|
| 683803 | 9/1966 | Belgium | 285/382.4 |
| 96986 | 6/1983 | Japan | 165/152 |
| 95390 | 6/1984 | Japan | 165/150 |
| 40622 | 3/1985 | Japan | 228/173.2 |
| 653880 | 5/1951 | United Kingdom | 228/173.4 |

Primary Examiner—John Rivell
Assistant Examiner—L. R. Leo
Attorney, Agent, or Firm—Banner, Birch, McKie & Beckett

[57] ABSTRACT

A heat exchanger includes a serpentine tube, a plurality of fins provided on the sides of the tube, and unions into which the respective end portions of the tube are inserted and to which the end portions are brazed. An expanded portion is formed on the tip of each inserted end portion of the tube, and a corresponding engaging portion is provided in each union. The expanded portion is engaged with the engaging portion of the union. Since the end portion of the tube is temporarily fixed to the union by the engagement of the expanded portion with the engaging portion, it is possible to simultaneously braze the tube to the union, and the tube to the fins, in a furnace. The manufacturing process of the heat exchanger can be simplified, the efficiency of the brazing process is increased, and the quality of the brazed portion is consistently high.

22 Claims, 3 Drawing Sheets

HEAT EXCHANGER AND METHOD FOR MANUFACTURING

BACKGROUND OF THE INVENTION

1. Field of the Invention

The present invention relates to a heat exchanger for use as an evaporator or a condenser for an air conditioner or for a radiator or heater core for vehicle or other type heat exchanger, and a method for manufacturing the heat exchanger.

2. Description of the Prior Art

FIGS. 6 and 7 show a typical conventional heat exchanger which allows heat to exchange between a heat exchange medium (for example, cooling medium or brine) flowing in the heat exchanger and air passing through the heat exchanger. A heat exchanger 21 shown in FIG. 6 comprises a serpentine flat tube 22 through which a heat medium passes, a plurality of radiation fins 23 provided on the sides of the substantially parallel portions of the tube, and unions 24 connected to the end portions of the tube.

Union 24 has a hexagonal outer shape in cross section and has a screw thread 24a on the surface of its one end portion, as shown in FIG. 7. In union 24, a flat insertion hole 24b is formed having substantially the same shape in cross section as tube 22 and into which the end portion of tube 22 is inserted, In addition, passage hole 24c, having a circular cross section, is also formed in union 24.

Radiation fins 23 are brazed on the sides of the parallel portions of tube 22. The end portions of tube 22 are inserted into the insertion holes 24b of the respective unions 24, and fixed to the respective unions at portions A by brazing.

The heat exchanger is manufactured usually by inserting each end portion of tube 22 into each union 24 after brazing radiation fins 23 and the tube in a furnace, and subsequently connecting and fixing the end portion of the tube to the union by brazing.

In such a conventional heat exchanger, however, since the connection of tube 22 and union 24 is performed in a separate operation from the brazing of tube 22 and radiation fins 23, the manufacturing process of the heat exchanger is complicated and expensive. Moreover, because tube 22 and union 24 are brazed manually by a worker, the quality of the brazing is difficult to control. The quality of the brazed portions obtained by such a manner varies according to the abilities of individual workers. Poorer quality brazed portions are likely to deteriorate. If the brazing is not performed in a desired manner, a crack is liable to occur in the brazed portion, and a fluid is likely to leak from the brazed portion.

SUMMARY OF THE INVENTION

Accordingly, an object of the present invention is to provide a heat exchanger which can be manufactured efficiently by a simple process which can easily maintain substantially constant high quality brazed joints and to provide a method for manufacturing such a heat exchanger.

To achieve this object, a heat exchanger according to the present invention is herein provided. The heat exchanger comprises a serpentine tube through which a heat exchange medium passes. A plurality of fins are provided on the sides of the substantially parallel portions of the tube, along with at least one union into which the one end portion of the tube is inserted and to which the one end portion of the tube is fixed. An expanded portion is formed on the tip of the inserted end portion of the tube, and an engaging portion is provided in the union. The expanded portion of the end portion of the tube is engaged with the engaging portion of the union.

A method for manufacturing the heat exchanger according to the present invention comprises the steps of inserting the end portion of the tube into the union, forming an expanded portion on the tip of the inserted end portion of the tube and engaging the expanded portion with an engaging portion provided in the union, and connecting the end portion of the tube to the union.

In the heat exchanger according to the present invention, the end portion of the tube is inserted into the union, the expanded portion formed on the tip of the inserted end portion is engaged with the engaging portion provided in the union, and the end portion of the tube is fixed to the union. Since the end portion of the tube is temporarily fixed to the union by the engagement of the expanded portion with the engaging portion, it is possible to simultaneously braze the tube and the union, and the tube and the fins, in a furnace. Therefore, the manufacturing process of the heat exchanger can be simplified. Moreover, since the tube and the union can be brazed without manual brazing by a worker, the cost of the brazing operation is reduced. Further, since the tube and the union are brazed in a furnace without any manual brazing step, the quality of the brazed portion is consistent and high without any variation in quality. As a result, cracks on the brazed portion and a leakage of the fluid from the brazed portion can be prevented.

BRIEF DESCRIPTION OF THE DRAWINGS

A preferred exemplary embodiment of the invention will now be described with reference to the accompanying drawings, which are given by way of example only, and are not intended to limit the present invention.

DETAILED DESCRIPTION OF A PREFERRED EMBODIMENT OF THE INVENTION

Figure 1:
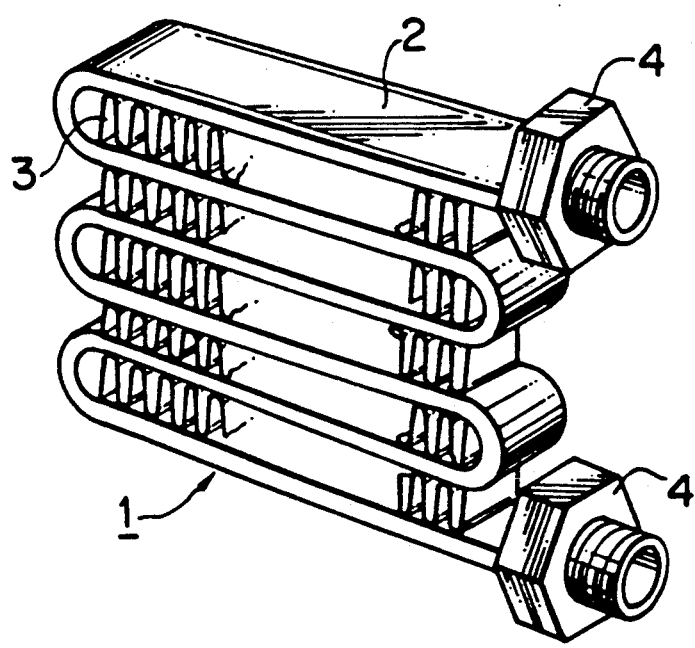
FIG. 1 is a perspective view of a heat exchanger according to an embodiment of the present invention.
Figure 2:
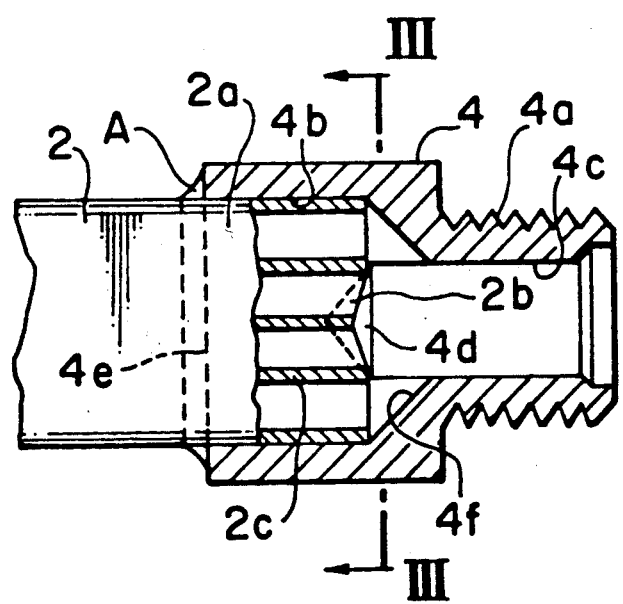
FIG. 2 is an enlarged sectional view of the connection portion of the end portion of the tube and the union of the heat exchanger shown in FIG. 1.
Figure 3:
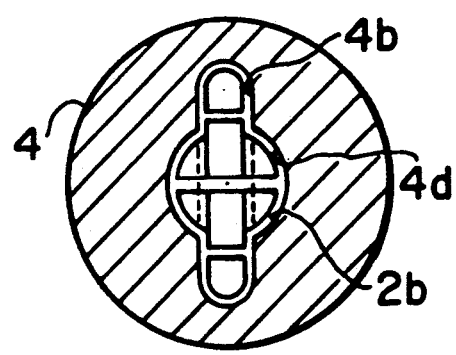
FIG. 3 is a cross sectional view of the union shown in FIG. 2, taken along III—III line of FIG. 2.

Referring to the drawings, FIGS. 1 to 3 illustrate a heat exchanger according to an embodiment of the present invention. In FIG. 1, a heat exchanger 1 has a serpentine flat tube 2 through which a heat exchange medium (for example, cooling medium) passes. A plurality of radiation fins 3 are provided on the sides of the substantially parallel portions of tube 2. Unions 4 are provided into which the respective end portions 2a of tube 2 are inserted and to which the respective end portions of the tube are fixed at brazing portions A by brazing.

Union 4 has a hexagonal outer shape in cross section, and has screw thread 4a on the surface of its one end portion. Flat insertion hole 4b has substantially the same inner shape as the outer shape of tube 2 in cross section and into which the end portion 2a of tube 2 is inserted. Passage hole 4c has a circular cross section whose diameter is larger than the thickness of flat insertion hole 4b. This circular passage hole 4c is formed in union 4 at a position slightly beyond the terminal end of insertion hole 4b. The portion of passage hole 4c extending into flat insertion hole 4b is formed as an engaging portion 4d to be engaged with an expanded portion of tube 2 described below. Engaging portion 4d is formed to reduce its diameter in cross section in the direction towards an insertion port 4e of union 4 through which end portion 2a of tube 2 is inserted. Engaging portion 4d is shown here as having a conical shape although other shapes are possible. A tapered surface 4f is provided between insertion hole 4b and passage hole 4c, and tapered surface 4f connects the corners on the terminal end of flat insertion hole 4b and the inner surface of passage hole 4c.

End portion 2a of tube 2 is inserted into insertion hole 4b of union 4. An expanded portion 2b is formed on the tip of the end portion 2a of tube 2 at the central portion in the width direction of flat tube 2. Expanded portion 2b is also formed to reduce its diameter in cross section in the direction towards insertion port 4e of union 4. Expanded portion 2b is shown here as having a conical shape. Expanded portion 2b is engaged with engaging portion 4d of union 4. Tube 2 is shown here as having a plurality of partitions 2c to divide the inside space of the tube into a plurality of flow paths.

The heat exchanger having such a structure is manufactured, particularly the connection of the tube and the union is performed, as follows.

Figure 4A:
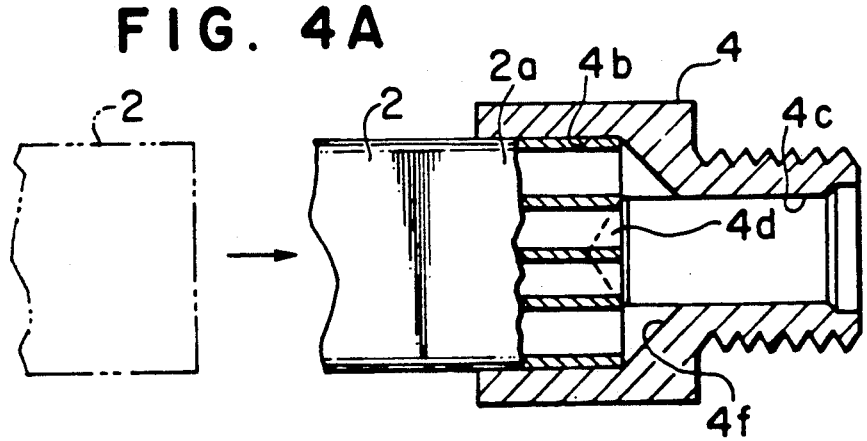
FIGS. 4A to 4C are enlarged sectional views of the connection portion of the end portion of the tube and the union of the heat exchanger shown in FIG. 1, showing a manufacturing process for the heat exchanger.

First, end portion 2a of tube 2 is inserted into insertion hole 4b of union 4 such that the terminal end of the end portion 2a comes into contact with the end of tapered surface 4f, as shown in FIG. 4A.

Figure 4B:
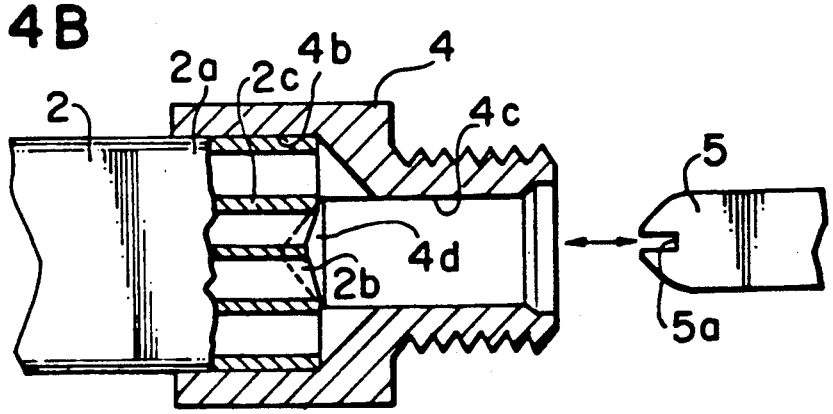

Next, a punch 5 is inserted into passage hole 4c of union 4 from the other side, as shown in FIG. 4B. The tip portion of punch 5 is pressed onto the tip of the inserted tube 2. Punch 5 has a diameter slightly smaller than the inner diameter of passage hole 4c, and has a notch 5a accepting one of partitions 2c at its tip portion. The outer shape of the tip portion of punch 5 is formed as substantially the same shape of engaging portion 4d. Notch 5a accepts the central partition 2c therein when punch 5 is inserted into passage hole 4c, and thereafter, the tip portion of the punch presses the tip of tube 2. By pressing the punch onto the tip of tube 2, the central portion of the tip of inserted tube 2 is expanded substantially to match the shape of the tip portion of punch 5, and formed expanded portion 2b engaged with engaging portion 4d.

Figure 4C:
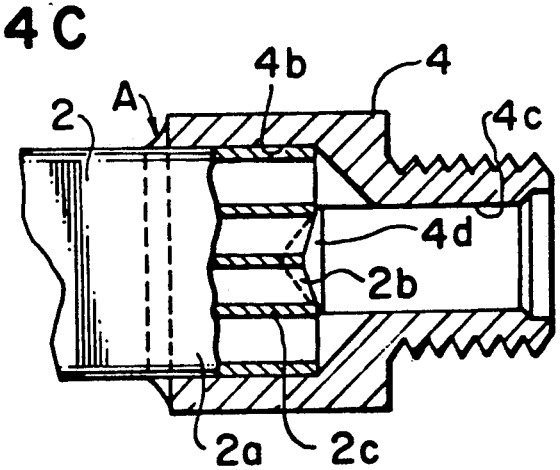
Figure 5:
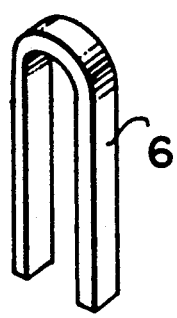
FIG. 5 is a perspective view of a brazing filler used for brazing the end portion of the tube and the union shown in FIGS. 4A to 4C.
Figure 6:
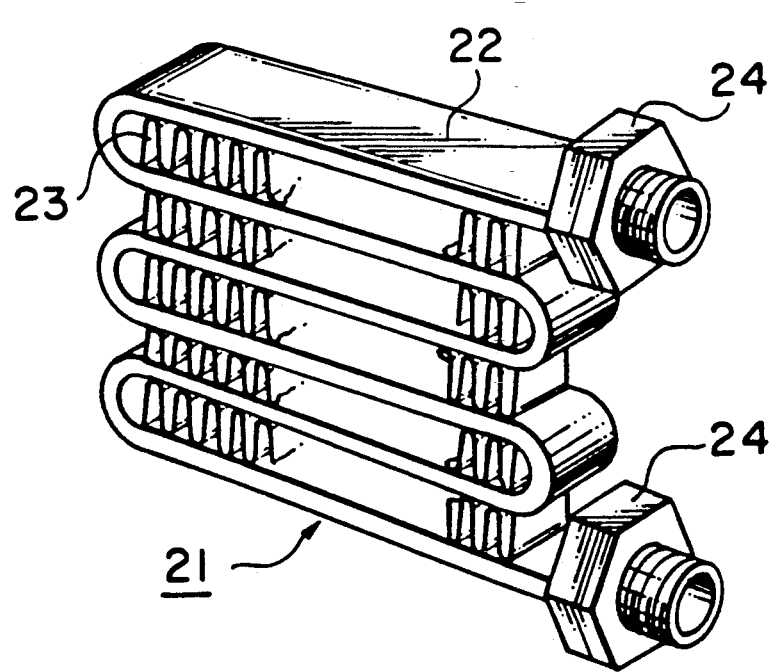
FIG. 6 is a perspective view of a conventional heat exchanger.
Figure 7:
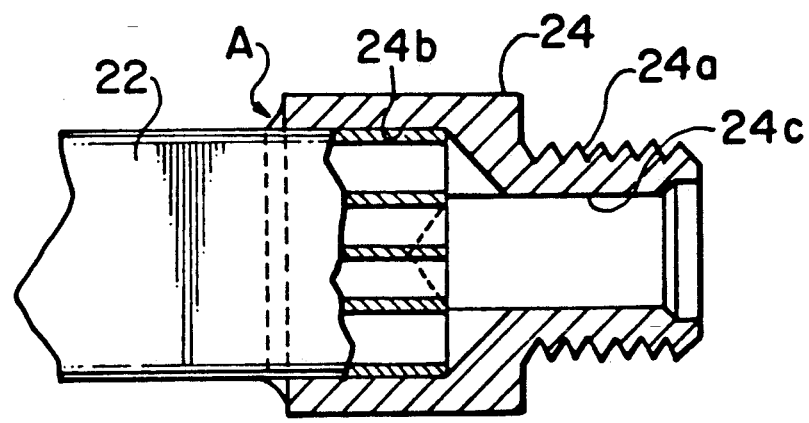
FIG. 7 is an enlarged sectional view of the connection portion of the end portion of the tube and the union of the heat exchanger shown in FIG. 6.

Thereafter, tube 2 is fixed to union 4 at the portion A by brazing, as shown in FIG. 4C. In this brazing, for example, a U-shaped brazing filler 6 such as one shown in FIG. 5 is used. After brazing fillers 6 are disposed at the position corresponding to portion A shown in FIG. 4C on the connection portions of the end portions of tube 2 and unions 4, radiation fins 3 are assembled to the tube, and the tube, radiation fins and the unions are simultaneously brazed in a furnace to form the heat exchanger.

Thus, since the end portion of tube 2 is temporarily fixed to union 4 by the engagement of expanded portion 2b with engaging portion 4d before the end portion is brazed to the union in the manufacture of the heat exchanger, the positional relationship between the end portion of the tube and the union can be maintained to a desired relationship and the union can be prevented from falling off the tube, even if an external force or vibration is applied to the assembly when the assembly is conveyed into a furnace. Therefore, connection defects and brazing defects between tube and the unions can be prevented, and the quality of the heat exchanger can be increased.

Further, because tube 2 is brazed simultaneously to unions 4 and fins 3, the manufacturing process of the heat exchanger can be simplified. By simultaneously brazing the fins and unions in a furnace, manual brazing work by a worker is not necessary. Therefore, a brazing defect due to variations in worker quality does not occur, and a constant and desired brazing quality without defects causing a crack or leakage of the fluid can be easily obtained with a high working efficiency.

Although engaging portion 4c is shown as a conical shape in the above embodiment, the shape of engaging portion 4c is not particularly restricted, as long as engaging portion 4c can engage expanded portion 2b. For example, engaging portion 4c may be formed as a stepped portion or a groove. On the other hand, expanded portion 2b of the tube may be formed as a projection or a cut and bent portion, as long as expanded portion 2b can engage the engaging portion 4c and prevent tube 2 from falling out of the union 4. Further, although tube 2 is shown as a flat tube in the embodiment, tube 2 may have a circular or rectangular cross section if insertion hole 4b of union 4 has a corresponding shape in its cross section.

Although only one preferred embodiment of the present invention has been described herein in detail, it will be appreciated by those skilled in the art that various modifications and alterations can be made to the embodiment without materially departing from the novel teachings and advantages of this invention. Accordingly, it is to be understood that all such modifications and alterations are included within the scope of the invention as defined by the following claims.

I claim:

1. In a heat exchanger including a serpentine tube through which a heat exchange medium passes, a plurality of fins provided on the sides of substantially parallel portions of said tube, and at least one union into which one end portion of said tube is inserted and to which said one end portion of said tube is brazed, the improvement comprising:

an expanded portion formed on a central part of a tip of said end portion of said tube, and an engaging portion provided in said union for engaging said expanded portion, wherein said expanded portion is formed by expanding a central part of a tip of the end portion of said tube with a diameter reduced in cross section in a direction towards an insertion port of said union through which said end portion of said tube is inserted into said union.

2. A heat exchanger according to claim 1 wherein said union is provided for each of the end portions of said tube.

3. A heat exchanger according to claim 1 wherein said tube is a flat tube.

4. A heat exchanger according to claim 1 wherein said expanded portion is formed as a substantially conical shape.

5. A heat exchanger according to claim 1 wherein said engaging portion is formed with a diameter reduced in cross section in a direction towards an insertion port of said union through which said end portion of said tube is inserted into said union.

6. A heat exchanger according to claim 5 wherein said engaging portion is formed as a substantially conical shape.

7. A heat exchanger according to claim 3 wherein said union has therein an insertion hole having a substantially flat cross section into which said tube is inserted and a passage hole having a circular cross section.

8. A heat exchanger according to claim 7 wherein a tapered inner surface is provided between said insertion hole and said passage hole in said union.

9. A heat exchanger according to claim 1 wherein said union has a hexagonal outer shape.

10. A heat exchanger according to claim 1 wherein said tube has therein a plurality of partitions.

11. A method for manufacturing a heat exchanger including a serpentine tube through which a heat exchange medium passes, a plurality of fins provided on the sides of the substantially parallel portions of said tube, and at least one union connected to one end portion of said tube, the method comprising the steps of:
   inserting said end portion of said tube into said union;
   forming an expanded portion on a central part of a tip of said inserted end portion of said tube and engaging said expanded portion with an engaging portion provided in said union; and
   connecting said end portion of said tube to said union.

12. A method according to claim 11 wherein said forming step further comprises the steps of inserting a punch into said union from the side contrary to the side from which said end portion of said tube is inserted, and expanding the tip of said inserted end portion of said tube by said punch.

13. A method according to claim 12 wherein the tip of said punch is formed as substantially the same shape as the shape of said engaging portion.

14. A method according to claim 11 wherein said end portion of said tube inserted into said union is connected to said union by disposing a brazing filler on the connecting portion and brazing said end portion of said tube and said union.

15. A method according to claim 14 wherein said brazing filler is U-shaped.

16. A method according to claim 11 wherein said tube has therein a plurality of partitions, and said punch has a notch accepting one of said plurality of partitions at its tip position.

17. A method according to claim 11 further comprising the step of brazing said tube to said fins, and said tube to said union substantially simultaneously in a furnace.

18. A fluid coupling comprising:
   a tube including at least one end having an expanded portion formed on a central part of a tip of said at least one end;
   a union into which said at lest one end of said tube is inserted and to which said at lest one end of said tube is brazed; and
   an engaging portion provided in said union for engaging said expanded portion of said tube,
   wherein said expanded portion is formed with a diameter reduced in cross section in a direction towards an insertion port of said union through which said end portion of said tube is inserted into said union and has a substantially conical shape.

19. A method for manufacturing a fluid coupling including a tube and at least one union brazed to one end portion of said tube, the method comprising the steps of:
   inserting said end portion of said tube into said union;
   forming an expanded portion on a central part of a tip of said inserted end portion of said tube and engaging said expanded portion with an engaging portion provided in said union, said forming step further comprises the steps of:
      inserting a punch into said union from the side contrary to the side from which said end portion of said tube is inserted; and
      expanding a central part of a tip of said inserted end portion of said tube by said punch; and
   connecting said end portion of said tube to said union by disposing a brazing filler on said end portion of said tube and brazing said nd portion of said tube and said union,
   wherein the central part of the tip of said punch is formed as substantially the same shape as the shape of said engaging portion.

20. A method for manufacturing a heat exchanger including a serpentine tube through which a heat exchange medium passes, a plurality of fins provided on the sides of the substantially parallel potions of said tube, and at least one union connected to one end portion of said tube, the method comprising the steps of:
   inserting said end portion of said tube into said union;
   forming an expanded portion on the tip of said inserted end portion of said tube and engaging said expanded portion with an engaging portion provided in said union; and
   connecting said end portion of said tube to said union.
   wherein said tube has therein a plurality of partitions, and said punch has a notch accepting one of said plurality of partitions at its tip position.

21. A method for manufacturing a heat exchanger including a tube through which a heat exchange medium passes, a plurality of fins provided on the sides of said tube, and at least one union connected to one end portion of said tube, the method comprising the steps of:
   inserting said end portion of said tube into said at least one union;
   forming an expanded portion on a central part of a tip of said inserted end portion of said tube and engaging said expanded portion with an engaging portion provided in said at least one union;
   attaching said plurality of fins to said tube; and
   simultaneously brazing said plurality of fins and said at least one union to said tube in a brazing furnace,
   wherein said step of forming prevents said at least one union from becoming detached from said tube during said brazing step.

22. A method according to claim 21 wherein said forming step further comprises the steps of inserting a punch into said union from the side contrary to the side from which said end portion of said tube is inserted, and expanding a central part of a tip of said inserted end portion of said tube by said punch.

* * * * *